J. BERENDS.
GEAR CASING FOR DRIVING AND STEERING WHEELS.
APPLICATION FILED AUG. 10, 1910.
990,798.
Patented Apr. 25, 1911.
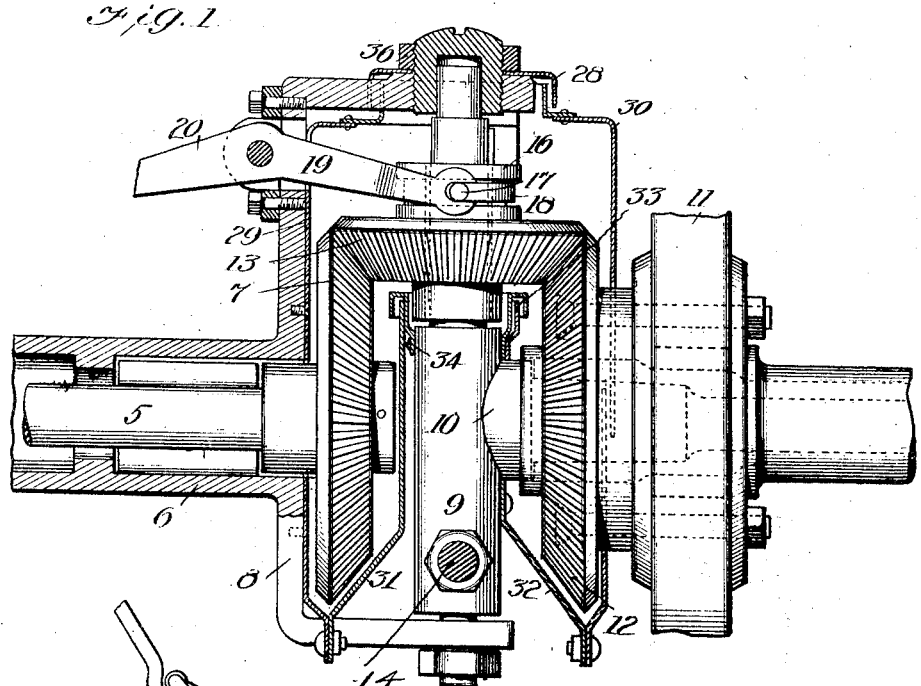
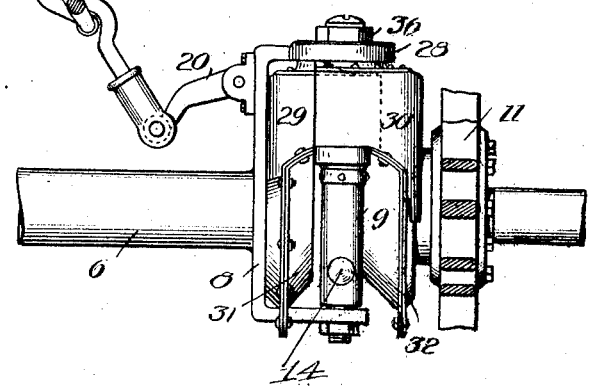
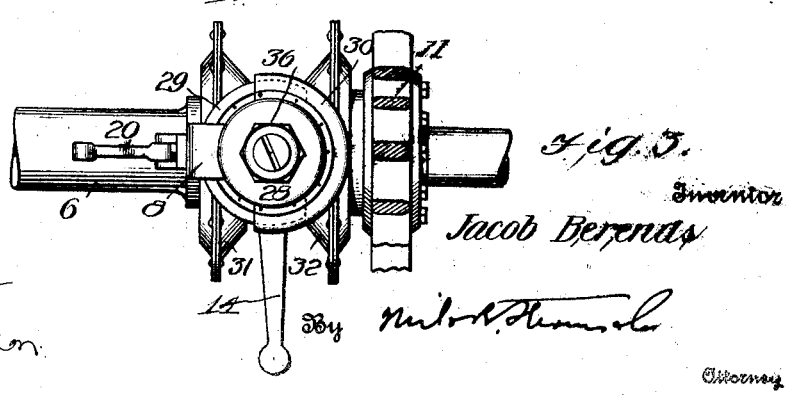
Witnesses
F. C. Barry
M. R. Wilson
Inventor
Jacob Berends
By _____ Attorney

UNITED STATES PATENT OFFICE.

JACOB BERENDS, OF ENGLEWOOD, KANSAS.

GEAR-CASING FOR DRIVING AND STEERING WHEELS.

990,798.      Specification of Letters Patent.     Patented Apr. 25, 1911.

Original application filed April 21, 1910, Serial No. 556,742. Divided and this application filed August 10, 1910. Serial No. 576,534.

*To all whom it may concern:*

Be it known that I, JACOB BERENDS, a citizen of the United States, residing at Englewood, in the county of Clark and State of Kansas, have invented certain new and useful Improvements in Gear-Casing for Driving and Steering Wheels, of which the following is a specification.

My present invention relates to a casing for the gears incident to my improved driving and steering wheels for automobiles, described and claimed in my application filed April 21, 1910, and serially numbered 556,742, of which the present application is a division.

In the accompanying drawing, which shows my invention, Figure 1 is a vertical section. Fig. 2 is a side elevation, and Fig. 3 is a top plan view.

The gearing, as shown, comprises a driving shaft 5 extending through a hollow axle 6 and having upon its end a bevel gear 7 within a vertical yoke-frame 8 rigid with the adjacent end of the axle, said yoke-frame having apertures adjacent the ends of its arms to receive the reduced threaded lower end and smooth upper end of the vertical pivot pin 9. This pivot pin rigidly supports the inner end of the wheel spindle 10 upon which the hub 11 revolves, said hub having a bevel gear 12 directly opposing the driving shaft gear 7. The pivot pin 9 also has a lower transverse bore in which the inner end of the steering arm 14 is locked, and carries the transmission gear 13 slidable thereon, so that it may be moved into or out of engagement with gears 7 and 12. Said gear 13 has an upper sleeve 16, provided with an annular channel in which is disposed a split collar having trunnions 17 to be engaged by the slotted extremities of a yoke 18, forming part of a lever 19 to which the actuating levers 20 are connected.

The upper connection of the pin 9 is secured in the yoke-frame 8 by a lock nut 36, which serves to hold a flanged cap 28 overlapping the inner upstanding flanges of the outer housings 29 and 30 secured to yoke-frame 8 and pivot pin 9, respectively, outside of the gears 7 and 12. The upper portions of these housings, 29 and 30 are curved, as shown, and overlap so as not to interfere with the swinging of the hub, and have the lower side portions provided with apertured edge flanges, to which are bolted the similar flanges of the inner housings 31 and 32, located between pin 9 and gears 7 and 12. The upper ends of the inner housings 31 and 32 are lapped by a cap 33, secured to upper end of inner housing 32. The flanged collar 34 overlapping 33 is mounted on pivot pin 9. This construction renders the housing of the gears practically dust proof, without interfering with the movement of the gear 13 or the guiding of the wheel.

I claim:

The combination with a driving shaft, a wheel spindle, gears carried by said shaft and spindle, and a gear connecting said first named gears, of outer housings secured outside the first named gears, having lower portions provided with flanges and upper portions provided with curved and overlapping sides and inner upstanding flanges above the connecting gear, a flanged cap overlapping said upstanding flanges, inner housings upon the inner sides of the gears, having lower flanges secured to the lower flanges of the outer housings, and provided with contiguous upper ends below the connecting gear, and a flanged cap secured to overlap said upper ends of said inner housings.

In testimony whereof I affix my signature in presence of two witnesses.

JACOB BERENDS.

Witnesses:
FRED BERENDS,
GEORGE PEMBERTON.